United States Patent
Won et al.

(10) Patent No.: US 8,829,066 B2
(45) Date of Patent: Sep. 9, 2014

(54) POLYMERIZATION REACTOR FOR PRODUCING SUPER ABSORBENT POLYMERS AND METHOD OF PRODUCING SUPER ABSORBENT POLYMERS USING THE POLYMERIZATION REACTOR

(75) Inventors: Tae-Young Won, Busan (KR); Gi-Cheul Kim, Daejeon (KR); Sang-Gi Lee, Daejeon (KR); Kyu-Pal Kim, Daejeon (KR); Chang-Sun Han, Daejeon (KR)

(73) Assignee: LG Chem, Ltd. (KR)

( * ) Notice: Subject to any disclaimer, the term of this patent is extended or adjusted under 35 U.S.C. 154(b) by 214 days.

(21) Appl. No.: 13/382,018

(22) PCT Filed: Jun. 22, 2010

(86) PCT No.: PCT/KR2010/004043
§ 371 (c)(1),
(2), (4) Date: Jan. 3, 2012

(87) PCT Pub. No.: WO2011/002172
PCT Pub. Date: Jan. 6, 2011

(65) Prior Publication Data
US 2012/0108695 A1    May 3, 2012

(30) Foreign Application Priority Data

Jul. 3, 2009 (KR) .................. 10-2009-0060530

(51) Int. Cl.
| | |
|---|---|
| *B29C 71/04* | (2006.01) |
| *C08F 2/46* | (2006.01) |
| *C08G 61/04* | (2006.01) |
| *B01J 19/20* | (2006.01) |
| *C08F 2/48* | (2006.01) |
| *B01F 7/04* | (2006.01) |
| *B01J 19/12* | (2006.01) |

(52) U.S. Cl.
CPC .......... *B01J 19/20* (2013.01); *B01J 2219/1943* (2013.01); *B01J 2219/00779* (2013.01); *C08F 2/48* (2013.01); *B01F 7/04* (2013.01); *B01J 2219/182* (2013.01); *B01J 19/123* (2013.01)
USPC ....................... 522/3; 522/1; 520/1

(58) Field of Classification Search
USPC ............................ 522/3, 1; 520/1
See application file for complete search history.

(56) References Cited

U.S. PATENT DOCUMENTS

| | | | |
|---|---|---|---|
| 5,059,664 A | 10/1991 | Yada et al. | |
| 5,250,640 A | 10/1993 | Irie et al. | |
| 6,335,406 B1 | 1/2002 | Nagasuna et al. | |
| 2006/0047092 A1* | 3/2006 | Marx et al. | ....... 526/64 |
| 2007/0048516 A1* | 3/2007 | Flohr et al. | ..... 428/323 |
| 2008/0188586 A1* | 8/2008 | Bruhns et al. | ..... 522/153 |
| 2008/0193870 A1 | 8/2008 | Paffhausen et al. | |

FOREIGN PATENT DOCUMENTS

| | | |
|---|---|---|
| CN | 1030919 A | 2/1989 |
| CN | 1544495 A | 11/2004 |
| CN | 101043937 A | 9/2007 |
| CN | 101289526 A | 10/2008 |
| EP | 0947530 A1 | 10/1999 |
| KR | 1994-0008994 | 9/1994 |
| KR | 1996-0006621 Y1 | 5/1996 |
| KR | 1997-0009231 | 6/1997 |
| TW | 200502258 | 1/2005 |

OTHER PUBLICATIONS

Lodige Dispersing Mixer, 2009, Lodige Process Technology.*
Bepex mixer, Turbulizer, Bepex webpage.*
Bepex Wet Agglomeration, Bepex webpage.*
International Search Report, PCT/KR2010/004043, dated Jan. 18, 2011.

* cited by examiner

*Primary Examiner* — Ling Choi
*Assistant Examiner* — Jessica E Whiteley
(74) *Attorney, Agent, or Firm* — Lerner, David, Littenberg, Krumholz & Mentlik, LLP

(57) ABSTRACT

The present invention provides a polymerization reactor for producing a super absorbent polymer comprising: a reaction unit; a monomer composition supply unit being connected to the reaction unit and supplying a monomer composition solution containing a monomer, a photoinitiator, and a solvent; an agitating shaft extended in the reaction unit from one end of the reaction unit connected to the monomer composition supply unit to the other end of the reaction unit; a plurality of agitating blades installed around the agitating shaft; and a light irradiation unit providing light to the monomer composition solution furnished from the monomer composition supply unit, and a method of producing super absorbent polymers by using the same.

16 Claims, 2 Drawing Sheets

POLYMERIZATION REACTOR FOR PRODUCING SUPER ABSORBENT POLYMERS AND METHOD OF PRODUCING SUPER ABSORBENT POLYMERS USING THE POLYMERIZATION REACTOR

CROSS REFERENCE TO RELATED APPLICATIONS

The present application is a national phase entry under 35 U.S.C. §371 of International Application No. PCT/KR2010/004043, filed Jun. 22, 2010, published in Korean, which claims the benefit of Korean Patent Application No. 10-2009-0060530, filed Jul. 3, 2009. The disclosures of said applications are incorporated by reference herein.

FIELD OF THE INVENTION

The present invention relates to a polymerization reactor for producing super absorbent polymers and a method of producing super absorbent polymers using the polymerization reactor. More specifically, the present invention is directed to a polymerization reactor for producing super absorbent polymers wherein in the polymerization of super absorbent polymers, the uniformly-irradiated light secures uniformity in polymerization reactions, making it possible to ensure the quality of the super absorbent polymers and to increase productivity, and a method of producing super absorbent polymers by using the same.

BACKGROUND OF THE ART

A super absorbent polymer (SAP) is a type of synthetic polymeric materials capable of absorbing moisture in 500 to 1000 times its own weight. Various manufacturers have been denominated it as different names such as "Super Absorbency Material" (SAM) or "Absorbent Gel Material" (AGM). Since such super absorbent polymers started to be practically applied in sanitary products, they have been widely used for hygiene products such as disposable diapers for children, water retaining soil products for gardening, water stop materials for the civil engineering and construction, sheets for raising seedling, fresh-keeping agents for food distribution fields, and materials for poultice and the like.

The super absorbent polymers can be typically prepared in a powdery form by polymerizing the monomers for resins, and then drying and grinding the same.

In the process for preparing the super absorbent polymers, a step of polymerizing the monomers is critical for determining the properties of polymers. For such polymerization methods, a reverse phase suspension polymerization, a thermal polymerization, and a photo-polymerization have been known in the art. Among them, some photo-polymerization method involves polymerizing a monomer composition by placing the monomer composition for polymers on a belt and irradiating the same with a light from the top.

However, during such polymerization as described above, the amount of irradiation can vary with a depth in the monomer composition, resulting in an uneven degree of polymerization depending on the location. For example, when a predetermined thickness of the monomer composition is placed on a belt, the top of the monomer composition located closely to a light source obtains much of light irradiation, thereby undergoing polymerization relatively in excess. By contrast, the bottom of the monomer composition located away from the light source fails to secure a sufficient amount of light irradiation so that the polymerization cannot proceed completely and leaves behind the monomers as not be polymerized. In such case, the properties of the super absorbent polymers can deteriorated. In a bid to address such problems, one can change the light intensity or the light irradiation time depending on the position in a monomer composition solution, but this measure can make the process more complicated and lead to a longer processing time, lowering the productivity.

DETAILED DESCRIPTION OF THE INVENTION

Technical Objectives

The present invention is to provide a polymerization reactor for producing super absorbent polymers that can raise productivity with enhancing the properties of the super absorbent polymers, and a method of producing super absorbent polymers by using the same.

Technical Solutions

The present invention provides a polymerization reactor for producing a super absorbent polymers, which comprises: a reaction unit; a monomer composition supply unit being connected to the reaction unit and supplying a monomer composition solution containing a monomer, a photoinitiator, and a solvent; an agitating shaft extended in the reaction unit from one end of the reaction unit connected to the monomer composition supply unit to the other end of the reaction unit; a plurality of agitating blades installed around the agitating shaft; and a light irradiation unit providing light to the monomer composition solution supplied from the monomer composition supply unit.

The light irradiation unit can be overlapped with a part of the agitating shaft, wherein the light irradiation unit can have an overlap with 1 to 40% of a total length of the agitating shaft. It is in the overlap between the agitating shaft and the light irradiation unit that the polymerization of the monomer can occur.

The light irradiation unit can irradiate the composition with UV radiation at a light intensity of 0.1-10 mw/cm$^2$.

The light irradiation unit can include a first light irradiation unit located between the monomer composition supply unit and the agitating shaft.

The light irradiation unit can further comprise a second light irradiation unit located so as to be overlapped with a portion of the agitating shaft, wherein the second light irradiation unit can have an overlap with 1-40% of a total length of the agitating shaft.

Materials for an outer wall of the light irradiation unit is not particularly limited, but it can be made of any materials having a light absorbency of at most 20% for a light with a wavelength of 350 nm, such as glass or polycarbonate.

Further, the present invention provides a method of producing super absorbent polymers, which comprises the steps of preparing a monomer composition solution comprising a monomer, a photoinitiator and a solvent; and subjecting the monomer composition solution to a photo-polymerization by using the polymerization reactor.

The photo-polymerization can be carried out as the monomer composition solution is in a flow.

In the photo-polymerization, the monomer composition solution can be irradiated with UV radiation at a light intensity of 0.1-10 mw/cm$^2$ per unit area.

The production method of super absorbent polymers can further comprise a step of grinding the photo-polymerized super absorbent polymers after the photo-polymerization.

Now, the polymerization reactor for producing super absorbent polymers according to an embodiment of the present invention will be explained with reference to FIG. 1.

FIG. 1 is a schematic view illustrating a polymerization reactor for producing super absorbent polymers in accordance with an embodiment of the present invention.

Referring to FIG. 1, a polymerization reactor 100 comprises a monomer composition supply unit P1, a reaction unit P2, and a grinding unit P3.

The monomer composition supply unit P1 comprises a plurality of raw material supply units A, B, C for supplying raw materials of the super absorbent polymers and a solvent supply unit D for supplying a solvent.

In this regard, the raw materials for super absorbent polymers can be, for example, monomers, alkaline compounds for neutralizing the monomers, photoinitiators, crosslinkers, and all sorts of additives, and the solvent is not particularly limited as long as it can dissolve the raw materials. Although three raw material supply units A, B, and C are shown in FIG. 1, the present invention is not limited thereto and it can be modified in a different way depending on the number of the raw materials.

The raw materials of the super absorbent polymer are uniformly mixed with a solvent in a mixing unit S to be prepared as a monomer composition solution, which is then delivered to a reaction unit P2.

The reaction unit P2, which may be a circular column, an oval column or a polygonal column shape with a predetermined space therein, has one end equipped with a solution inlet (not shown) running from the monomer composition supply unit P1 to be supplied with the solution and the other end equipped with a outlet (not shown) capable of delivering the super absorbent polymers after completion of the reaction in the reaction unit P2 to a grinding unit P3.

In the reaction unit P2 are provided an agitating shaft 50 extended in the reaction unit P2 from one end connected with the monomer composition supply unit P1 to the other end and a plurality of agitating blades 55 installed around the agitating shaft, and the agitating shaft 50 can be connected to and driven by an electric motor for agitation 51.

The reaction unit P2 comprises a part for polymerizing the monomer composition solution so as to produce the super absorbent polymers and a part for drying the super absorbent polymers as polymerized or subjecting them to a first grinding, in which the agitating shaft 50 can agitate the monomer composition solution from side to side and up and down in the polymerization step or the drying (or the first grinding) step.

Inside or outside the reaction unit P2 is provided a light irradiation unit 45. The light irradiation unit 45 irradiates light of the UV range from about 100 to 400 nm to trigger a photo-polymerization for the monomer composition solution. In case where the light irradiation unit 45 is provided outside the reaction unit P2, the light irradiation unit 45 and the reaction unit P2 can be made of such a transparent material (e.g., glass) that the light as irradiated from the light irradiation unit 45 can sufficiently reach the monomer composition solution. Materials for an outer wall of such light irradiation unit 45 or the transparent reaction unit P2 corresponding thereto is not particularly limited but it can be made of any materials having a light absorbency of at most 20% for light whose wavelength is 350 nm, for example, glass, quartz or polycarbonate.

The irradiation amount of the light irradiation unit 45 can vary with the contents of the raw materials of the super absorbent polymers or the flow rate of the monomer composition solution in the reaction unit, but it is preferably irradiated at a light intensity of 0.1 to 10 mw/cm$^2$.

The monomers contained in the monomer composition solution are polymerized in such a part where the light irradiation unit 45 is overlapped with the agitating shaft 50. Preferably, the light irradiation unit 45 is overlapped with 1 to 40% of a total length of the agitating shaft 50.

While the composition comprising the super absorbent polymers as polymerized from the monomer composition solution continues to be agitated by the agitating shaft 50 and the agitating blades 51, at least a portion of the solvent as remained in the composition, for example, water can be removed. To this end, a drying step can be carried out at a temperature of 80 to 200° C. for 20 to 120 minutes, wherein the solvent can be discharged outside through a vapor removing unit.

During the polymerization of the super absorbent polymers as described above, the monomer composition solution is agitated from side to side and up and down by the agitating shaft 50 and the agitating blade 51 while it keeps changing its position. Accordingly, it is possible to prevent non-uniform polymerization wherein some portion of the monomer composition solution located so close to the light irradiation unit 45 to get much of the irradiation amount of the light is polymerized in excess while the other portion located too far from the light irradiation unit 45 to get sufficient amount of light irradiation fails to complete the polymerization. This can achieve a uniform polymerization of the monomers, thereby lowering the amount of the residual monomers in the super absorbent polymer, decreasing the amount of water soluble components (the extractable content) such as a low molecular weight polymer, and thus making it possible to improve the properties of the super absorbent polymers.

In addition, the super absorbent polymers thus obtained is agitated from side to side and up and down by the agitating shaft 50 and the agitating blade 51 while the solvent being eliminated therefrom. Therefore, one can avoid a problem that the solvent is left behind in the super absorbent polymer while being eliminated only from the surface thereof, and thereby achieve a uniform dry. Moreover, the super absorbent polymer can be subjected to a first grinding to some extent by the agitating blades 51.

Furthermore, since there is no need to change the light intensity or the light irradiation time for the purpose of preventing non-uniform polymerization and non-uniform dry, one can avoid a complicated process and shorten the processing time, thereby making an improvement on productivity.

The super absorbent polymer as polymerized in the reaction unit P2 can be discharged into a grinding unit P3 to be cut or grinded into a smaller one.

Now, a polymerization reactor for producing super absorbent polymers according to other embodiments of the present invention will be explained with reference to FIG. 2.

FIG. 2 is a schematic view illustrating a polymerization reactor for producing super absorbent polymers in accordance with other embodiments of the present invention.

Referring to FIG. 2, like the above embodiment, the polymerization reactor 100 comprises a monomer composition supply unit P1, a reaction unit P2, and a grinding unit P3.

The explanation for the monomer composition supply unit P1 will be skipped since it is the same as set forth in the foregoing embodiment.

The reaction unit P2 comprises a part having a plurality of light irradiation units 45 irradiating with light the monomer composition solution that is in a flow, and a part for carrying out an additional polymerization in conjunction with a drying or a first grinding while agitating the composition comprising super absorbent polymers as photo-polymerized by an agitating shaft 50 and an agitating blade 55. In this regard, each of the parts can be controlled by a supply valve 48.

At this time, the monomer composition solution can be divided into at least two parts to be polymerized. This can reduce the amount of the monomer composition solution that undergoes a polymerization per a light irradiation unit 45, making it possible to enhance uniformity of the photo-polymerization. Further, the light irradiation unit 45 can be arranged above and below the monomer composition solution for producing super absorbent polymers to irradiate the composition with light, and thereby uniformity of the polymerization of the monomer composition solution can be further enhanced.

The super absorbent polymer as polymerized in the reaction unit P2 can be discharged into a grinding unit P3 to be cut or grinded into a smaller one.

Hereinafter, a polymerization reactor for producing super absorbent polymers in accordance with still other embodiment of the present invention will be explained with reference to FIG. 3.

FIG. 3 is a schematic view illustrating the polymerization reactor for producing super absorbent polymers in accordance with still other embodiment of the present invention.

Referring to FIG. 3, like the above embodiments, the polymerization reactor 100 comprises a monomer composition supply unit P1, a reaction unit P2, and a grinding unit P3.

The explanation for the monomer composition supply unit P1 will be skipped since it is the same as set forth in the foregoing embodiment.

Unlike the foregoing embodiments, the reaction unit P2 comprises two light irradiation units 45.

A first light irradiation unit 45*a* is a part where the monomer composition solution as provided from the monomer composition supply unit P1 is irradiated with light while it is in a flow and undergoes a polymerization. A second light irradiation unit 45*b* is a part arranged to be overlapped with an agitating shaft 50, wherein the monomer composition solution undergoes a polymerization while being agitated by an agitating shaft 50 and an agitating shaft 55. The second light irradiation unit 45*b* is preferably overlapped with 1-40% of a total length of the agitating shaft 50.

As described above, conducting the steps of irradiating the monomer composition solution with light while it is in a flow and irradiating the monomer composition solution with light in conjunction with agitating it can further increase a degree of polymerization and uniformity of polymerization, thereby enhancing the properties of the super absorbent polymer.

The super absorbent polymer as polymerized in the reaction unit P2 can be discharged into a grinding unit P3 to be cut or grinded into a smaller one.

Hereinafter, a method of producing super absorbent polymers by using the foregoing polymerization reactor for producing super absorbent polymers will be explained.

The method of producing super absorbent polymers in accordance with an embodiment of the present invention comprises the steps of preparing a monomer composition solution comprising raw materials of super absorbent polymers; and subjecting the monomer composition solution to a photo-polymerization by using the polymerization reactor for a photo-polymerization in accordance with the embodiments of the present invention.

Raw materials for the super absorbent polymers may comprise a monomer, an alkaline compound for neutralizing the monomer, a photoinitiator, a crosslinker, and all sorts of additives.

Any monomers typically available in the production of super absorbent polymers can be used with no limitation. In this regard, one can use at least one selected from the group consisting of anionic monomers and the salts thereof, nonionic hydrophilic-containing monomers, and unsaturated monomers containing an amino group and their quaternized compounds.

Specifically, one can preferably use at least one selected from the group consisting of anionic monomers such as (meth)acrylic acid, anhydrous maleic acid, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid and the salts thereof; nonionic hydrophilic-containing monomers such as (meth)acrylamide, N-substituted (meth)acrylate, 2-hydroxyethyl(meth)acrylate, 2-hydroxypropyl(meth)acrylate, methoxy polyethyleneglycol (meth)acrylate or polyethyleneglycol(meth)acrylate; and unsaturated monomers containing an amino group such as (N,N)-dimethylaminoethyl(meth)acrylate or (N,N)-dimethylaminopropyl(meth)acrylamide and their quaternized compounds.

More preferably, acrylic acid or a salt thereof may be used, and using these monomers makes it possible to produce the super absorbent polymer more economically while enhancing absorbency of the super absorbent polymers.

The monomers can be included in an amount of 20 to 60% by weight with respect to a total content of the monomer composition solution. When the monomer is included in an amount of the above range, the properties of the super absorbent polymer prepared therefrom can be further enhanced and the preparation process of the super absorbent polymer can be made more convenient.

As the alkaline compound, one can use any compound with no limitation so long as it shows alkalinity when being dissolved in water. As examples of such alkaline compound, mentions may be made of any one selected from alkali metal hydroxide such as potassium hydroxide and sodium hydroxide; hydrides such as lithium hydride and sodium hydride; amide compounds such as lithium amide, sodium amide, and potassium amide; alkoxide compounds such as sodium methoxide and potassium methoxide; and any combination thereof.

The alkaline compounds may be included in an amount of 7 to 20% by weight with respect to a total content of the monomer composition solution. When being included in an amount of the above range, the alkaline compounds can properly neutralize the monomers so that the solubility of the monomer composition in water can be further improved and the super absorbent polymer obtained from such monomer composition can have better properties such as absorbency and the like.

As the photoinitiator, any compound can be used with no limitation so long as it can form a radical by light such as UV radiation. As the photoinitiator, one can use any one selected from the group consisting of benzophenone, xanthone, thioxanthone, acetophenone, ethyl anthraquinone, 2-mercaptobenzothiazole, benzoin methyl ether, benzoin isopropyl ether, 2-mercapto benzooxazolyl and 2-metcaptobenzoimidazole, alone or in combination of two or more of the above compounds.

The photoinitiator can be included in an amount of 0.01 to 0.3% by weight with respect to a total content of the monomer composition solution. When the photoinitiator is included in an amount of the above range, the reactivity of the monomer composition can be optimized and the amount of water soluble components (the extractable content) in the super absorbent polymers decreases such that the properties of the super absorbent polymer can be further improved.

As the crosslinker, one can use any one selected from the group consisting of diacrylate crosslinkers including hexanediol diacrylate, ethyleneglycol diacrylate, diethyleneglycol diacrylate, triethyleneglycol diacrylate, propyleneglycol diacrylate, dipropyleneglycol diacrylate, and tripropylene diacrylate; triacrylate crosslinkers; aziridine crosslinkers; and epoxy crosslinkers, alone or in combination of two or more of the above compounds.

The crosslinker can be included in an amount of 0.01 to 0.5% by weight with respect to a total content of the monomer composition solution. When the crosslinker is included in an amount of the above range, polymerization state of the super absorbent polymers obtained therefrom can be optimized and the amount of water soluble components (the extractable content) in the super absorbent polymers decreases such that the properties of the super absorbent polymer can be further improved.

As examples of the additives, mentions may be made of a thickener, a plasticizer, a shelf-life stabilizer, and an antioxidant.

The monomers, the alkaline compounds, the photoinitiators, the crosslinkers, and the additives may be prepared in the form of a solution.

Available solvents comprise any one with no limitation so long as they can dissolve the foregoing components, and for example, any one selected from the group consisting of water, ethanol, ethyleneglycol, diethylene glycol, triethylene glycol, 1,4-butanediol, propylene glycol, ethyleneglycol monobutyl ether, propylene glycol monomethyl ether, propylene glycol monomethyl ether acetate, methyl ethyl ketone, acetone, methyl amyl ketone, cyclohexanone, cyclopentanone, diethyleneglycol monomethyl ether, diethyleneglycol ethyl ether, toluene, xylene, butyrolactone, carbitol, methyl cellosolve acetate and N,N-dimethylacetamide can be used alone or in combination of two of more of the above compounds.

The solvent can be included as the rest amount other than the foregoing components with respect to a total content of the monomer composition solution.

The monomer composition solution is supplied from the monomer composition supply unit of the polymerization reactor for a photo-polymerization and then provided with light such as UV radiation from the light irradiation unit to trigger the polymerization reaction. At this time, the monomer composition solution is polymerized uniformly from side to side and up and down by using the agitating shaft extended between both ends of the reaction unit and the agitating blades. It can also be uniformly polymerized in a flow by the light irradiation unit located above or below the composition.

The monomer composition solution can be uniformly supplied with light from the light irradiation unit. Accordingly, one can prevent the monomer composition solution from being given a different amount of the irradiated light depending on the depth or the location so that it is possible to produce a super absorbent polymer with a polymerization degree that is uniform regardless of the location. Moreover, one needs not change the light intensity or the light irradiation time depending on the location of the monomer composition solution for the purpose of getting a uniform irradiation of light, so that the process can be made simple and the processing time can be shortened, which makes it possible to increase productivity.

After the polymerization of the monomer composition solution, the polymerization product thus obtained is subjected to processes such as grinding, drying, and the like to give super absorbent polymers, and such processes including grinding or drying can follow a typical process for the preparation of the super absorbent polymers.

Moreover, after the process of grinding and drying, and the like, a process for crosslinking the surface of the super absorbent polymer can be further carried out. To this end, one can use epoxy compounds such as ethyleneglycol diglycidyl ether for the surface crosslinking, following a typical method of treating the surface of super absorbent polymers.

Advantageous Effects of the Invention

As described above, the polymerization reactor according to the embodiments of the present invention and the method of producing super absorbent polymers using the same can prevent the light irradiation amount as supplied from varying with a depth or a location in the monomer composition solution so that uniform degree of polymerization and excellent properties regardless of the location can be achieved. Moreover, one needs not change the light intensity or the light irradiation time depending on the location in the monomer composition solution for the purpose of uniformly irradiating the monomer composition solution with the light so that the process can be made simple and the processing time can be shortened, whereby an increased productivity may be achieved.

DETAILS FOR PRACTICING THE INVENTION

Hereinafter, actions and effects of the present invention will be explained in further detail with reference to the specific examples of the invention. However, it should be understood that these examples are merely illustrative of the present invention and the scope of the present invention is not to be determined by them.

<Preparation of Raw Materials for Super Absorbent Polymers>

A monomer composition for producing super absorbent polymers was prepared by supplying acrylic acid and caustic soda with using a pump from a separate reservoir, further supplying water, and then mixing them. Diphenyl-(2,4,6-trimethylbenzoyl)-phosphine oxide from Ciba Specialty Chemical Inc. was used for a photoinitiator, which was prepared in a separate reservoir as a 0.5 wt % solution together with acrylic acid and then supplied.

Preparation of Super Absorbent Polymers

Example 1

Figure 1:
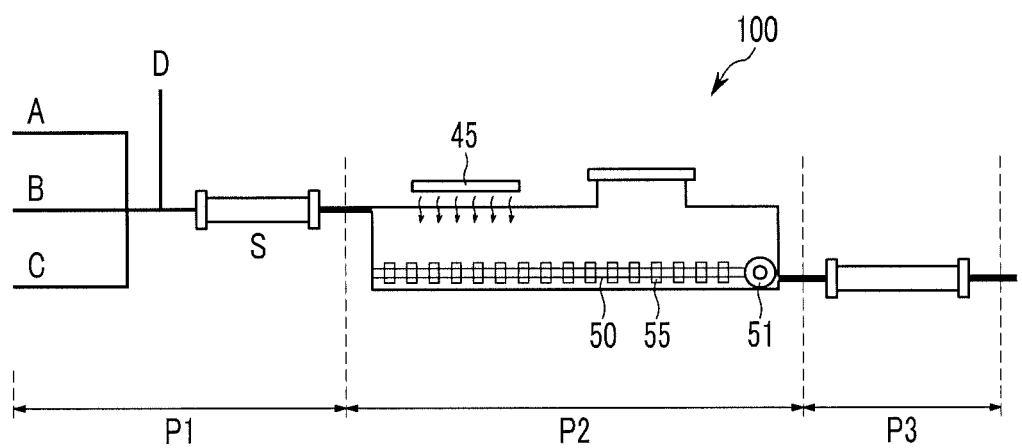
FIG. 1 is a schematic view illustrating a polymerization reactor for producing super absorbent polymers in accordance with an embodiment of the present invention.
Figure 2:
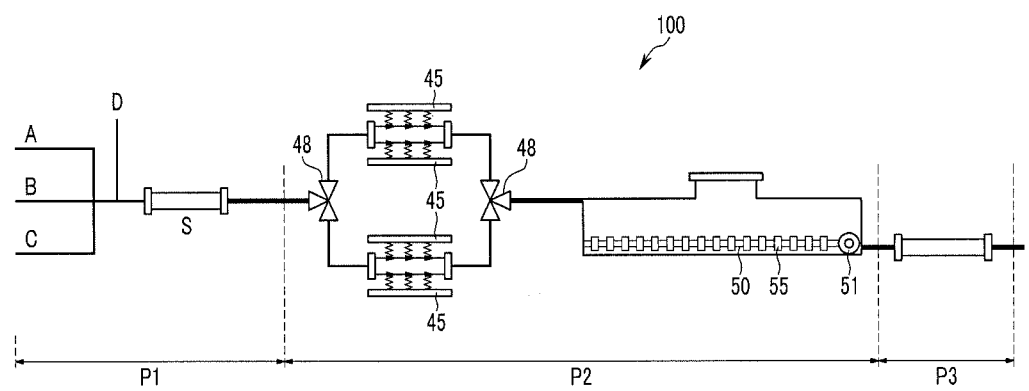
FIG. 2 is a schematic view illustrating a polymerization reactor for producing super absorbent polymers in accordance with other embodiment of the present invention.
Figure 3:
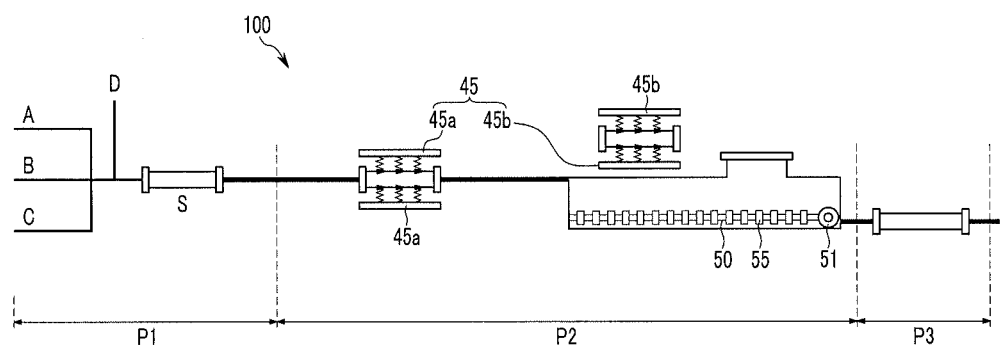
FIG. 3 is a schematic view illustrating a polymerization reactor for producing super absorbent polymers in accordance with still other embodiment of the present invention.

A super absorbent polymer was prepared in the following method by using the polymerization reactor for producing super absorbent polymer as shown in FIG. 1.

Among the raw materials of the super absorbent polymers as described above, caustic soda (NaOH) and water were put into a monomer composition supply unit, respectively, and the supply unit was controlled to supply them to a mixing unit at a weight ratio of 0.9:0.1. In the mixing unit, the aqueous solution of caustic soda was mixed with acrylic acid to give an aqueous solution of the monomer composition. In the aqueous solution of the monomer composition, each of the components was adjusted such that the neutralization degree of acrylic acid was 75 mol %, the concentration of the monomers (i.e., acrylic acid and its sodium salt) was 45% by weight, and the crosslinking concentration was $2.5 \times 10^{-5}$ mol %. Such aqueous solution of the monomer composition was directly supplied to a reactor via a line. At this time, the aqueous solution was supplied such that the height of the aqueous solution of the monomer composition was maintained at 2 cm, and while the solution was rotated by using an agitating shaft equipped with 9 agitating blades in the reactor at a speed of 3 to 15 rpm, the reaction for the aqueous solution of the monomer composition was carried out. In the region of 30% of the total length of the agitating shaft from the monomer inlet, the aqueous solution of the monomer composition under agitation was irradiated with UV radiation at a light intensity of 1.2 mw/cm$^2$ for 1 minute and thereby the polymerization reaction by UV radiation occurred for the aqueous solution of the monomer composition.

After the polymerization reaction was conducted with irradiating UV radiation for 1 minute as described above, the resulting product of the polymerization was kept at room temperature for 1 minute, cut in a size of 5 mm×5 mm, and dried in an oven at 160° C. for 3 hours. Thereafter, it was grinded by using a Lab grinder to have a size of 150-850 μm, providing a sample of the super absorbent polymer.

Then, the sample of the super absorbent polymer was subjected to a surface crosslinking by using a 3 wt % solution of ethylene glycol diglycidyl ether and then reacted at 120° C. for 1 hour to give a 150-180 μm, post-treated sample of the super absorbent polymer.

Example 2

A sample of the super absorbent polymer and a sample of the post-treated super absorbent polymer were prepared with the same method as Example 1 except that the irradiated amount of UV radiation was 0.8 mw/cm$^2$.

Example 3

A sample of the super absorbent polymer and a sample of the post-treated super absorbent polymer were prepared with the same method as Example 1 except that the aqueous solution of monomer composition was supplied such that the height of the aqueous solution in the reactor was maintained at 4 cm.

Example 4

A sample of the super absorbent polymer and a sample of the post-treated super absorbent polymer were prepared with the same method as Example 1 except that the aqueous solution of monomer composition was supplied such that the height of the aqueous solution in the reactor was maintained at 8 cm and the irradiation time was 3 minutes.

Comparative Example 1

A belt reactor was used instead of the polymerization reactor as shown in FIG. 1. After an aqueous solution of monomer composition was obtained in the same manner and under the same condition as set forth in Example 1, it was supplied onto a belt of the reactor. The aqueous solution of the monomer composition was supplied onto the belt such that the height of the aqueous solution was maintained at 2 cm, i,e, the same height as Example 1. While the solution was irradiated with UV at an irradiated amount of 1.2 mw/cm$^2$ on the belt with no additional agitation, the polymerization reaction was carried out. Thereafter, the resulting product was kept at room temperature, dried, grinded, and subjected to a post-treatment under the same condition as Example 1 to give a sample of the super absorbent polymer and a sample of the post-treated super absorbent polymer.

Comparative Example 2

A sample of the super absorbent polymer and a sample of the post-treated super absorbent polymer were prepared with the same method as Comparative Example 1 except that the irradiated amount of UV radiation was 0.8 mw/cm$^2$.

Comparative Example 3

A sample of the super absorbent polymer and a sample of the post-treated super absorbent polymer were prepared with the same method as Comparative Example 1 except that the aqueous solution of monomer composition was supplied such that the height of the aqueous solution in the reactor was maintained at 4 cm.

Comparative Example 4

A sample of the super absorbent polymer and a sample of the post-treated super absorbent polymer were prepared with the same method as Comparative Example 1 except that the aqueous solution of monomer composition was supplied such that the height of the aqueous solution in the reactor was maintained at 8 cm and the irradiation time was 3 minutes.

<Measurement of Properties of the Super Absorbent Polymers>

Properties of the super absorbent polymers according to Examples 1 to 4 and Comparative Examples 1 to 4 were measured in the following manner. The measurement of such properties was conducted for each of the samples of the super absorbent polymers prior to the post-treatment and the samples of the super absorbent polymers after the post-treatment. As a whole, the measurement of the properties was conducted according to a method as recommended by EDANA.

More specifically, in order to evaluate the centrifugal retention capacity (CRC) of the samples of the super absorbent polymers prior to and after the post-treatment of crosslinking, 0.2 g of each of the super absorbent polymer samples was put into a tea bag and subjected to precipitation absorbance in a 0.9 wt % saline solution for 30 minutes, and then it was dehydrated with a centrifugal force of 250 g for 3 minutes and the amount of moisture as absorbed by each sample was measured (in terms of a change in the weight).

In addition, the conversion rate was determined by the method wherein the sample cut in a size of 5 mm×5 mm directly after the polymerization was eluted in 1000 mL of distilled water for 3 hours and then the amount of the residual monomers was determined and changed into a conversion rate to the super absorbent polymer.

Moreover, absorption under pressure (AUP) and the extractable content were measured in accordance with the methods of EDANA, i.e., WSP 242.2 and WSP 270.2. The extractable content was determined for the samples of the super absorbent polymers prior to and after the crosslinking post-treatment, and AUP was determined for the samples of the super absorbent polymers after the crosslinking post-treatment.

Results of the measurements of these samples are summarized in Table 1.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Conversion rate (%) | 99.3 | 99.1 | 98.2 | 99.2 | 98.4 | 97.6 | 84.4 | 80.1 |
| CRC before post-treatment (g/g) | 42.1 | 40.4 | 45.5 | 41.3 | 38.3 | 42.6 | 46.0 | 48.6 |
| Extractable content before post-treatment (wt %) | 15.2 | 17.8 | 21.4 | 15.4 | 16.7 | 22.3 | 33.1 | 43.2 |
| AUP after post-treatment (wt %) | 25.2 | 24.8 | 23 | 25.4 | 24.5 | 23 | 21.4 | 15.8 |
| CRC after post-treatment (g/g) | 37.8 | 36.2 | 41.2 | 36.8 | 33.4 | 38.0 | 41.4 | 43.1 |
| Extractable content after post-treatment (wt %) | 12.3 | 13.4 | 17.5 | 12.4 | 12.6 | 18.6 | 25.7 | 32.8 |

The centrifugal retention capacity (CRC) of the super absorbent polymer is related to evaluation as to the capability of absorbing moisture and associated with a basic performance of the super absorbent polymers. By contrast, AUP of the super absorbent polymers evaluates a performance of absorbing moisture under a constant pressure and the extractable content is directed to the content of water soluble components in the super absorbent polymers, e.g., the content of low molecular weight polymerization component.

Generally speaking, as the centrifugal retention capacity (CRC) and AUP increase, the super absorbent polymers can be evaluated to have more excellent properties. In addition, when the super absorbent polymer is applied in personal care products such as diapers, its users would feel less discomfort caused by wetness or the like as the super absorbent polymer has a smaller amount of water soluble component (extractable content), and thus it can be evaluated to have more excellent the properties.

Typically, however, it was known that as the centrifugal retention capacity (CRC) is getting higher, the AUP decreases while the extractable content increases, and this has presented difficulties in enhancing the overall properties of the super absorbent polymers.

In contrast, the super absorbent polymers prepared in Examples 1 to 4 underwent a more uniform polymerization because they were prepared from the photo-polymerization by UV rays under agitation, and thus their overall properties were found to be excellent.

More specifically, it was found that not only do the super absorbent polymers of Examples 1 to 4 show high conversion rate from the monomers to the polymers, but also they are superior to the super absorbent polymers of Comparative Examples 1 to 4 in at least one properties selected from the centrifugal retention capacity (CRC), AUP, and the extractable content, and they exhibit an equal or higher level of the other properties not selected from the foregoing ones. In particular, this can be substantiated more definitely when comparison was made between the super absorbent polymers obtained under the same condition, i.e., between Example 1 and Comparative Example 1, between Example 2 and Comparative Example 2, between Example 3 and Comparative Example 3, and between Example 4 and Comparative Example 4, respectively.

Moreover, referring to Examples 3 and 4 and Comparative Examples 3 and 4, it was found that even when a larger amount of the aqueous solution of the monomer composition is supplied to constitute a thicker layer thereof, using the polymerization reactor of FIG. 1 makes it possible to achieve uniform UV irradiation and uniform polymerization under agitation and thereby the super absorbent polymers with excellent properties can be obtained at a higher conversion rate. These results confirmed that with using the polymerization reactor of FIG. 1, a large amount of the super absorbent polymers can be produced simultaneously with a higher yield so that the production process for the super absorbent polymers can be carried out more efficiently.

By contrast, reference to Comparative Examples 3 and 4 confirmed that when the polymerization was carried out on a belt reactor under UV irradiation, the aqueous solution of the monomer composition was not able to get uniform UV irradiation and polymerization so that the conversion rate to the super absorbent polymers sharply decreased and the properties of the super absorbent polymers thus obtained were deteriorated, as well.

From the foregoing, it was confirmed that the production method of the present invention can produce the super absorbent polymers at a higher conversion rate with an increased productivity by achieving more uniform UV irradiation for the monomer composition during the reaction and the super absorbent polymers thus obtained have superior properties.

Hereinabove, the present invention has been explained in detail with regard to its preferred embodiments, but the scope of the present invention shall not be limited thereto and should comprise various modification and improvements that can be made by a person of ordinary skill in the art with using the basic concept of the present invention.

What is claimed is:

1. A polymerization reactor for producing a super absorbent polymer, which comprises:
   a reaction unit;
   a monomer composition supply unit being connected to the reaction unit and supplying a monomer composition solution containing a monomer, a photoinitiator, and a solvent;
   an agitating shaft extended in the reaction unit from one end of the reaction unit connected to the monomer composition supply unit to the other end of the reaction unit;

a plurality of agitating blades installed around the agitating shaft; and a light irradiation unit providing light to the monomer composition solution supplied from the monomer composition supply unit, wherein the light irradiation unit is overlapped with 1-40% of a total length of the agitating shaft, wherein the light irradiation unit comprises a first light irradiation unit located between the monomer composition supply unit and the agitating shaft.

2. The polymerization reactor for producing a super absorbent polymer according to claim 1, wherein the monomers are polymerized in an overlap between the agitating shaft and the light irradiation unit.

3. The polymerization reactor for producing a super absorbent polymer according to claim 1, wherein the light irradiation unit irradiates UV radiation at a light intensity of 0.1-10 mw/cm$^2$.

4. The polymerization reactor for producing a super absorbent polymer according to claim 1, wherein the light irradiation unit further comprises a second light irradiation unit located to have an overlap with a part of the agitating shaft.

5. The polymerization reactor for producing a super absorbent polymer according to claim 4, wherein the second light irradiation unit has an overlap with 1-40% of a total length of the agitating shaft.

6. The polymerization reactor for producing a super absorbent polymer according to claim 1, wherein materials for an outer wall of the light irradiation unit is glass, quartz, or polycarbonate.

7. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 1.

8. The method of producing super absorbent polymers according to claim 7, wherein the photo-polymerization is carried out while the monomer composition solution is in a flow.

9. The method of producing super absorbent polymers according to claim 7, wherein in the photo-polymerization, the monomer composition solution is irradiated with UV at a light intensity of 0.1-10 mw/cm$^2$ per a unit area.

10. The method of producing super absorbent polymers according to claim 7, wherein it further comprises a step of grinding the photo-polymerized super absorbent polymers after the photo-polymerization.

11. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 2.

12. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 3.

13. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 1.

14. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 4.

15. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 5.

16. A method of producing super absorbent polymers comprising the steps of:
preparing a monomer composition solution containing a monomer, a photoinitiator, and a solvent; and
subjecting the monomer composition solution to a photo-polymerization by using a polymerization reactor according to claim 6.

* * * * *